United States Patent [19]

Yamada et al.

[11] Patent Number: 4,531,450
[45] Date of Patent: Jul. 30, 1985

[54] MULTI-STAGE ACTUATOR

[75] Inventors: Tosimichi Yamada, Fuji; Hideo Yoshida, Fujinomiya, both of Japan

[73] Assignee: Nihon Plast Co., Ltd., Shizuoka, Japan

[21] Appl. No.: 543,585

[22] Filed: Oct. 19, 1983

[30] Foreign Application Priority Data

Oct. 21, 1982 [JP] Japan ................. 57-185239

[51] Int. Cl.³ .................................................. F16J 3/04
[52] U.S. Cl. .......................................... 92/37; 92/48; 92/47; 91/167 R
[58] Field of Search .................... 92/37, 39, 48, 64; 91/167 R

[56] References Cited

U.S. PATENT DOCUMENTS

| 2,372,923 | 4/1945 | Yerger | 91/167 R |
| 2,466,415 | 4/1949 | Greenland | 92/37 |
| 2,991,763 | 7/1961 | Marette | 91/167 |
| 3,183,793 | 5/1965 | McCleery | 92/48 |
| 3,935,795 | 2/1976 | Hawley | 91/167 R |
| 4,282,800 | 8/1981 | Young et al. | 92/37 |

FOREIGN PATENT DOCUMENTS 496075  2/1974  Japan .

Primary Examiner—Robert E. Garrett
Assistant Examiner—Richard S. Meyer
Attorney, Agent, or Firm—Armstrong, Nikaido, Marmelstein & Kubovcik

[57] ABSTRACT

A two-stage actuator comprises a pair of axially aligned bellows molded from a thermoplastic material and connected at their adjacent ends by a molded link section integral with the bellows. The other end of one of the bellows is designed to be connected to a stationary machine part while the other end of the other bellows is designed to be connected to a movable machine part. Each bellows has an accordion-type convolution section pneumatically connected through a conduit and a valve to a vacuum source so that the convolution section is axially collapsed by vacuum when applied. A link member axially extends over the convolution section of the other bellows and has an end fixed relative to the one bellows. The other end of the other bellows is in the form of an axially elongated protrusion slidably extending through an opening formed in the other end of the link member. The protrusion and the opening cooperate to form a one-way connection which allows the protrusion to be moved relative to the opening toward the one bellows but prevents the protrusion from being moved relative to the opening toward the movable machine part whereby, when the one bellows is axially collapsed, the link member and the other bellows are moved a distance toward the stationary machine part to pull the movable machine part the same distance and, when the other bellows is axially collapsed with the one bellows kept collapsed, the movable machine part is further pulled an additional distance toward the stationary machine part.

7 Claims, 15 Drawing Figures

U.S. Patent  Jul. 30, 1985  Sheet 1 of 4  4,531,450
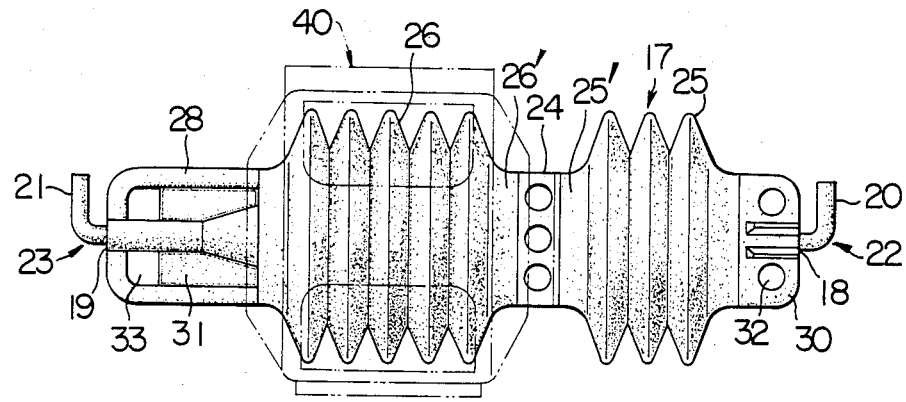
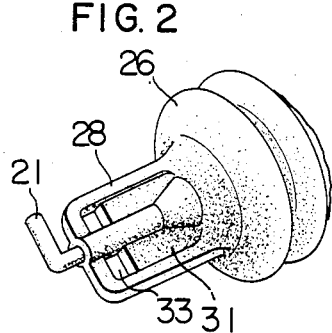
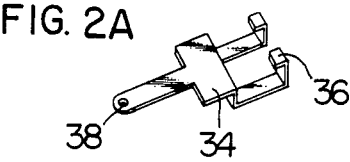
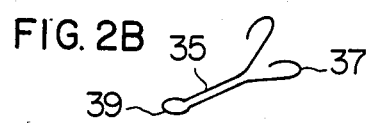
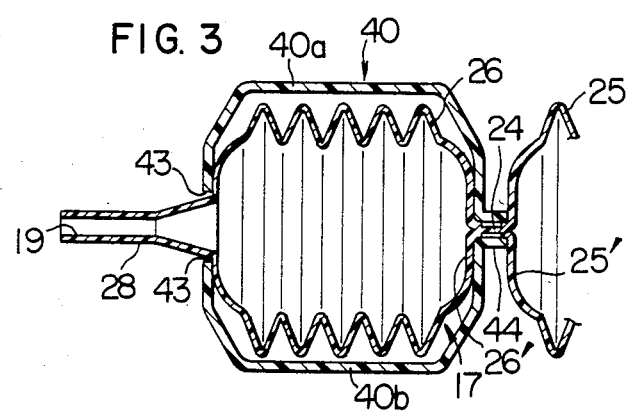

MULTI-STAGE ACTUATOR

BACKGROUND OF THE INVENTION

1. FIELD OF THE INVENTION

The present invention relates to a pneumatic multi-stage actuator usable to actuate a movable machine part such as a damper incorporated in an automotive air conditioner, for example.

2. DESCRIPTION OF THE PRIOR ART

An example of the pneumatic multi-stage actuator of the class specified above is disclosed in Japanese Patent Publication No. 49-6075 (6075/1974) published for opposition purpose on Feb. 12, 1974. The actuator disclosed in the Japanese publication comprises a hollow housing formed by two cup-shaped housing members formed of sheet metal. Two diaphragms of an elastomeric material are disposed in the housing to divide the interior thereof into three chambers one of which is vented to atmosphere, the two other chambers being pneumatically connected through conduits and valve means to a vacuum source. Compression coil springs are disposed in the vacuum chambers to act against the force of the vacuum when applied to the diaphragms. The diaphragms are mechanically interconnected by a stem which in turn is operatively associated with an end of an actuator rod connected at its other end to a damper incorporated in an automotive air conditioner. The actuator is arranged such that, when the valve means is operated to introduce vacuum into one of the two vacuum chambers, one of the diaphragms is moved or displaced a distance to move the actuator rod the same distance thereby to move the damper to a first stage position and, when the valve means is further operated to introduce vacuum into both vacuum chambers, the other diaphragm is displaced to move the damper to a second stage position.

The two-stage actuator discussed above, however, has shortcomings that it requires a large number of component parts; namely, two diaphragms of an elastomeric material, stem and actuator rod connected to the diaphragms, housing members of sheet metal sealingly secured to the outer peripheral edges of the diaphragms and springs installed in the vacuum chambers, that complicated steps are required to assemble these members together into the actuator resulting in an increased cost of manufacture and that a strict quality control is required to eliminate leakage which would otherwise occur if the components of the actuator are not completely sealingly assembled. An additional shortcoming is that, because the diaphragms are secured at their outer peripheries to the housing, the diaphragms can be deformed limited distances resulting in relatively short actuating strokes.

SUMMARY OF THE INVENTION

It is an object of the present invention to provide an improved multi-stage pneumatic actuator which has a decreased possibility of leakage, which can be easily and economically manufactured, which can be easily designed to provide desired actuating strokes and which reliably provides two-stage operation.

The multi-stage actuator according to the present invention comprises:

a pair of bellows each including a hollow accordion-type convolution section having ends closed by integral end sections and a vacuum port means pneumatically connecting the bellows to a vacuum source, the convolution section of each bellows having a plurality of axially arranged convolutions and being axially collapsible to shorten the axial dimension of the bellows when vacuum is introduced into the bellows through said vacuum port means;

said bellows being arranged in substantially axially aligned relationship;

means mechanically connecting one of the end sections of one of said bellows to an adjacent end section of the other bellows;

the other end section of said one bellows being designed to be fixed to a stationary machine part so that, when said convolution section of said one bellows is axially collapsed, said one end section of said one bellows is axially moved together with said mechanically connecting means and with the other bellows toward said stationary machine part;

the other end section of the other bellows being designed to be mechanically connected to a movable machine part; and means extending axially over the convolution section of the other bellows to prevent said convolution section of the other bellows from being axially stretched when said one bellows is axially collapsed and to transmit to said movable machine part the movement of said one end section of said one bellows toward said stationary machine part, said axially extending means and the other bellows being arranged such that the convolution section of the other bellows is axially collapsible relative to said axially extending means to move the other end section of the other bellows relative to said axially extending means toward said stationary machine part.

The two bellows may preferably be integral and molded from a thermoplastic elastomeric material such as polyester elastomer, polyolefin elastomer, polyurethane elastomer or soft polyamide. In this case, the mechanically connecting means may be a molded link section integral with the two bellowses and disposed between the two adjacent end sections thereof.

The other end section of the other bellows may preferably be in the form of an axially elongated protrusion extending axially from the adjacent end of the convolution section of the other bellows. The axially extending means may preferably be a link member molded from a thermoplastic material and having an end fixed relative to the mechanically connecting means. The other end of the link member may preferably be formed therein with an opening through which the protrusion of the other bellows may slidably extend toward the movable machine part.

The invention will be described by way of example with reference to the accompanying drawings.

BRIEF DESCRIPTION OF THE DRAWINGS

FIG. 1 is a side elevation of an embodiment of the multi-stage pneumatic actuator according to the present invention;

FIG. 2 is a fragmentary perspective view of the actuator showing an end section thereof;

FIGS. 2A and 2B are perspective view of connectors which can be used to connect the end section shown in FIG. 2 to a movable machine part;

FIG. 3 is a fragmentary axial sectional view of the actuator;

DESCRIPTION OF PREFERRED EMBODIMENTS

Figure 4A:
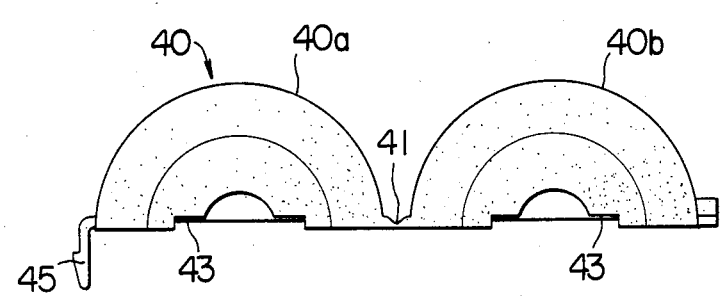
FIG. 4A is an end view of a link member before it is mounted on an associated bellows and is placed in a fully open position.

Referring first to FIGS. 1 to 3, a two-stage pneumatic actuator includes an axially collapsible member 17 which has been blow-molded from a parison of a thermoplastic elastomeric material. The collapsible member 17 has end sections 30 and 31 in which axial holes 18 and 19 are left by air-blowing pins or tubes (not shown) used to blow air into the parison to expand the same into the form shown in FIG. 1. Tubes 20 and 21 are sealingly fitted into these holes 18 and 19 to form vacuum port means 22 and 23. The member 17 has an axially central flat or web section 24 which divides the member 17 into first and second axially aligned bellows 25 and 26 which are pneumatically isolated from each other. In other words, the web section 24 acts as a link section which is integral with and interconnects the adjacent end sections 25′ and 26′ of the axially aligned bellowses 25 and 26. Each bellows has an accordion-type convolution section formed by a plurality of axially arranged convolutions, as best seen in FIG. 1. The vacuum port means 22 and 23 are pneumatically connected to the convolution sections of the two bellowses, respectively, so that the two bellowses are axially collapsible independently by the force of vacuum.

The convolution section of the second bellows 26 is enclosed by a link member 40 which will be described in detail later.

The outer end sections 30 and 31 are in the forms of generally planar and axially extending protrusions in which openings 32 and 33 are formed for mechanical connecting elements. More specifically, the end section 30 is designed to be secured or fixed to a stationary machine part such as a body of an associated automobile by means of screws (not shown) which extend through the openings 32 and the stationary machine part or a stay member secured thereto. The other end section 31 has substantially parallel side edges 28 and is designed to be secured or connected to a movable machine part (not shown) such as a damper of an automotive air conditioner for means of a connector, examples of which are shown at 34 and 35 in FIGS. 2A and 2B. The connector 34 is formed by a pressed sheet metal and has a pair of hooks 36 for engagement with the openings 33 in the actuator end section 31 and a hole 38 for a screw to be used to secure the connector 34 to the movable machine part. The connector 35 is formed by a wire strand which has been bent to provide two hooks 37 and a screw hole or loop 38. The connectors 34 or 35 can conveniently be used to connect the actuator end section 31 to the movable machine part. However, the structure of the connector is not a part of the present invention.

Figure 4B:
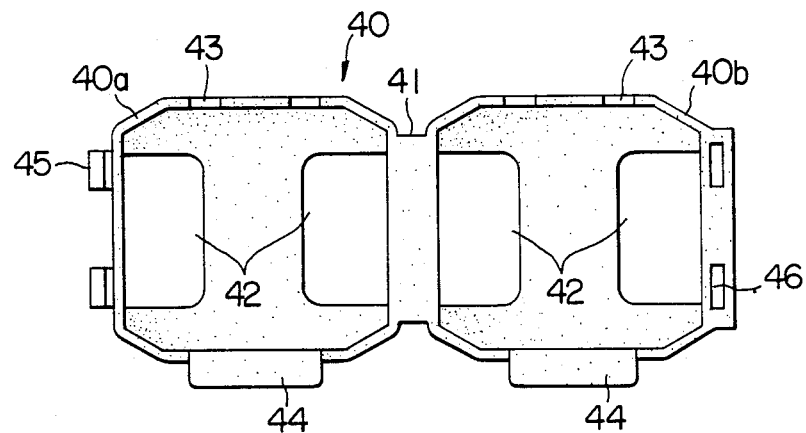
FIG. 4B is a plan view of the link member when in its fully open position.
Figure 4C:
FIG. 4C is an enlarged fragmentary sectional view of the link member showing a hinge section thereof.
Figure 4D:
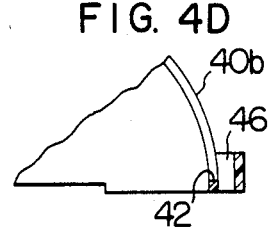
FIG. 4D is an enlarged fragmentary sectional view of the link member showing a part of locking means.

Referring to FIGS. 3 to 4D, the link member 40 is generally cylindrical and formed by two substantially semi-cylindrical parallel sections 40a and 40b which are connected by a hinge 41 disposed between the adjacent side edges of the two sections 40a and 40b when they are in an open position shown in FIGS. 4A and 4B. The two sections 40a and 40b and the hinge 41 are integrally molded from a thermoplastic material. The semicylindrical sections 40a and 40b have peripheral walls formed therein with openings or windows 42 and end walls substantially perpendicular to the axis of the cylindrical link member 40. The link member 40 has a locking means for keeping the two semi-cylindrical sections 40a and 40b in closed position or in cylindrical form. The locking means is formed by openings 46 formed along the side edge of the semi-cylindrical section 40b remote from the hinge 41 and by pawls 45 which are formed along the side edge of the semi-cylindrical section 40a remote from the hinge 41 and can be snapped into the openings 46. Thus, the two sections 40a and 40b can be easily closed over the convolution section of the second bellows 26 and can be kept in the closed position by the locking means.

Adjacent end walls of the two semi-cylindrical sections 40a and 40b are formed with cutouts or notches 43 which, when the two sections 40a and 40b are closed over the convolution section of the second bellows 26, cooperate to define an opening which slidably receives the planar end section 31 of the bellows 26, at best seen in FIG. 3. The other end walls of the semicylindrical sections 40a and 40b are both shaped to provide planar projections 44 which, when the two sections 40a and 40b are closed over the second bellows as described above, cooperate to frictionally grip the central web or link section 24 adjacent to the first bellows 25, as shown in FIG. 3.

Figure 5:
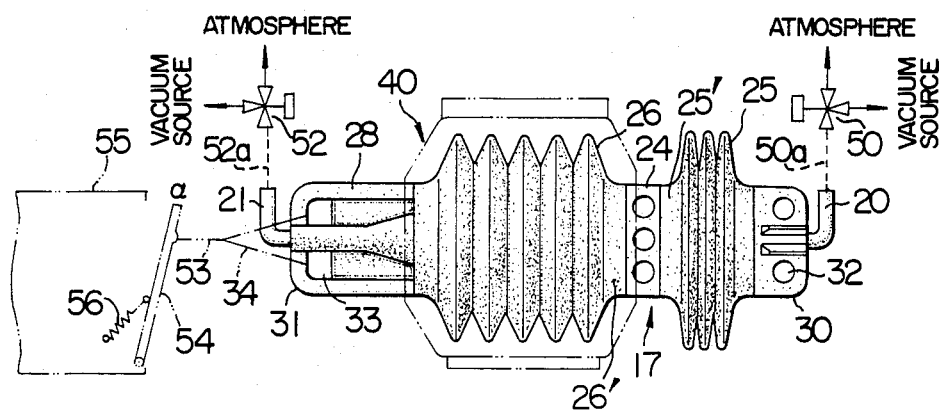
FIGS. 5 and 6 are partly diagrammatic side elevations of the actuator in different stages of its operation.
Figure 6:
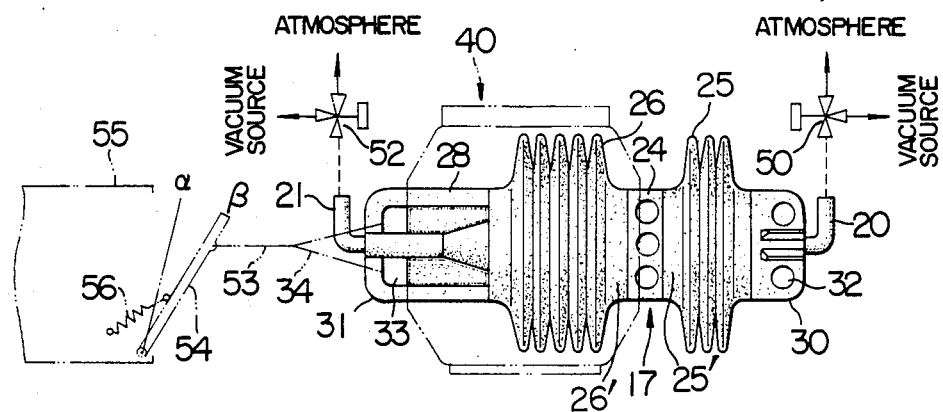

The operation of the two-stage pneumatic actuator will now be described with reference to FIGS. 5 and 6. The end section 30 of the first bellows 25 is secured to a stationary machine part (not shown) while the end section 31 of the second bellows 26 is connected through the connector 34 or 35 and also through a linkage represented by a broken line 53 to a damper 54 pivotally mounted in a duct 55 of an automotive air conditioner. The damper 54 is resiliently biased by a tension spring 56 in a direction away from the actuator. The tubes 20 and 21 of the vacuum port means of the actuator are pneumatically connected to control valves 50 and 52 through vacuum conduits 50a and 52a, respectively. The control valve 52 is operated to communicate the interior of the second bellows 26 to the atmosphere to keep this bellows axially expanded and, at the same time, the control valve 50 is operated to communicate the interior of the first bellows 25 with a vacuum source such as an intake manifold of an associated automotive engine so that the convolution section of the bellows 25 is axially collapsed, as shown in FIG. 5. Because the outer end section 30 of the bellows 25 is fixed to the stationary machine part, as mentioned above, the axial shrinkage of the bellows 25 causes the inner end section 25′ of the bellows to be shifted or moved rightward, as viewed in FIG. 5. It will be remembered that the web or link section 34 is frictionally gripped by the projections 44 at the righthand end of the link member 40. Thus, the rightward movement of the inner end section 25' of the first bellows 25 is transmitted through the link section 24 and also through the link member 40 to the left end of the convolution section of the second bellows 26 to rightwardly pull the outer end section 31 of the second bellows 26 whereby the connector 34 and the linkage 53 are also pulled rightwardly to angularly move or rotate the damper 54 against the spring 56 to a first-stage position α. It will be appreciated that, when the first bellows is axially collapsed to move the damper 54 to the position α, the link member 40 operates to prevent the convolution section of the second bellows 26 from being axially deformed or stretched from its normal expanded position shown in FIG. 5. Thus, the axial shrinkage of the first bellows 25 is reliably and accurately transmitted through the link member 40, the end section 31, the connector 34 and the linkage 53 to the damper 54.

When the control valve 52 is again operated to introduce vacuum into the second bellows 26 while the first bellows 25 is kept axially collapsed, the convolution section of the second bellows 26 is axially collapsed within the link member 40, so that the left and section 31 of the second bellows 26 is smoothly moved rightwardly through the opening defined by the notches 43. The opening defined by these notches 43 is shaped to act as a guide for the rightward movement of the side edges 28 of the end section 31 of the bellows 26. This movement is transmitted through the connector 34 and the linkage 53 to the damper 54 so that the same is further angularly moved against the spring 56 to a second-stage position β shown in FIG. 6.

As discussed above, the actuator is operative to provide two steps or stages or actuating strokes, the first stage being provided by the axial shrinkage of the first bellows 25 and the second stage being provided by the axial shrinkages of both first and second bellows 25 and 26.

In the described and illustrated embodiment of the invention, the two bellows 25 and 26 and the web or link section 24 are molded as a one-piece structure. This, however, is not an essential feature of the invention. The two bellows 25 and 26 may alternatively be molded separately and connected in series by an mechanical element such as a screw or screws.

In addition, the two semi-cylindrical sections 40a and 40b of the link member 40 may alternatively be formed as separate members which can be assembled and united into the cylindrical form, rather than being integrally connected by the hinge 41. Further modifications 40' and 40" of the link member 40 are shown in FIGS. 7 and 8.

Figure 7:
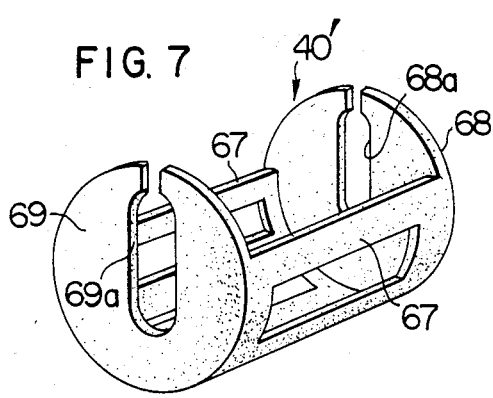
FIGS. 7 and 8 are perspective views of other embodiments of the link member.

The modified link member 40' shown in FIG. 7 is molded from a plastic material and has a plurality of axially extending parallel sections 67 and generally circular end walls 68 and 69 integral with the opposite ends of each section 67. The sections 67 are arranged along a semi-circle and circumferentially spaced from each other. The end wall 68 is formed therein with a slit 68a which, when the link member 40' is attached to the second bellows 26, can be snapped onto the link section 24 of the actuator. The other end wall 69 is formed therein with a larger slit or opening 69a which slidably receives therein the axially elongated protrusion 31 of the second bellows.

Figure 8:
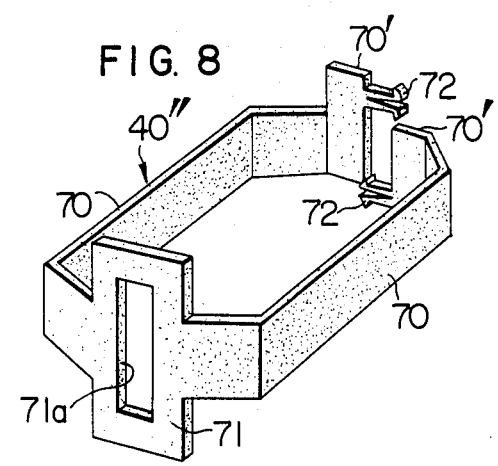

The modified link member 40" shown in FIG. 8 is also molded from a plastic material and has two axially extending parallel sections 70 and an end wall 71 which interconnects adjacent ends of the sections 70. An elongated slit or opening 71a is formed in the end wall 71 and designed to slidably receive therein the axial protrusion 31 of the second bellows 26 when the link member 40" is installed thereon. The other ends of the axially extending sections 70 are turned toward each other to provide radial walls 70' substantially perpendicular to the axis of the actuator. Pawls 72 are formed on the inner end edges of the radial walls 70' and designed to be snapped onto associated openings (not shown) formed in the link section 24 of the collapsible member 17.

Figure 9:
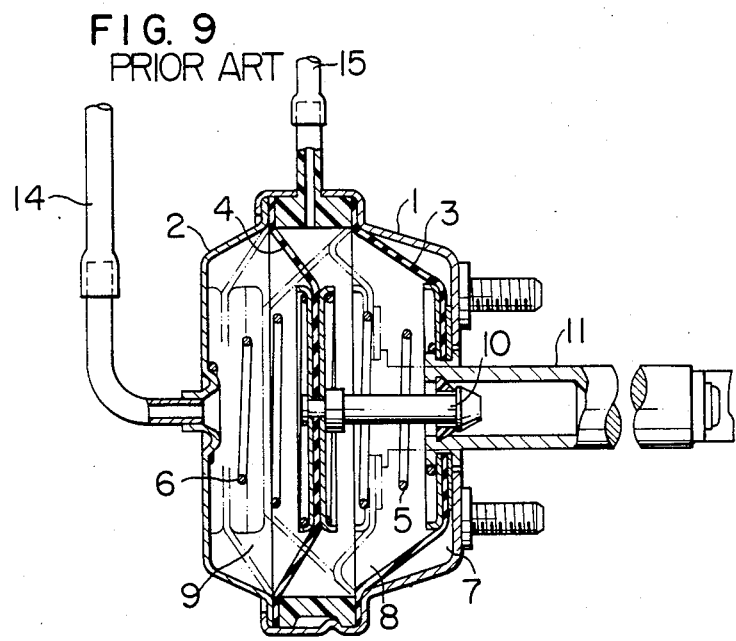
FIG. 9 is a enlarged partly sectional view of the prior art two-stage actuator.
Figure 10:
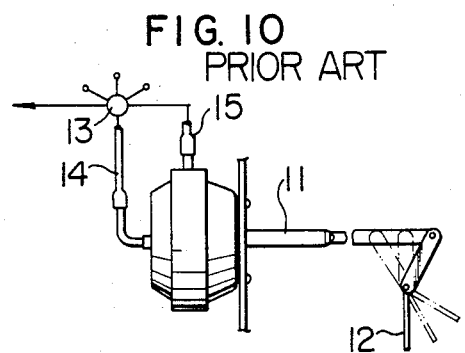
FIG. 10 is a partly diagrammatic side elevation of a damper controlling system including the prior art two-stage pneumatic actuator shown in FIG. 9.

FIGS. 9 and 10 show the prior art two-stage actuator referred to in the introductory part of this specification. The two diaphragms 3 and 4 are disposed in a single housing formed by two metal housing members 1 and 2 to cooperate therewith to define three chambers 7, 8 and 9. The chamber 7 is vented to the atmosphere, while the other chambers 8 and 9 are respectively pneumatically connected through conduits 15 and 14 and valve means 13 to a vacuum source and accommodate compression coil springs 5 and 6 which act against the force of vacuum exerted to the diaphragms 3 and 4, respectively. The actuator rod 11 slidably extends through an opening in one end wall of the housing and has an inner end sealingly secured to the diaphragm 3. The outer end of the actuator rod 11 is operatively connected to the damper 12. The stem 10 is sealingly secured at an end to the other diaphragm 4. The other end of the stem 10 is operatively associated with the inner end of the actuator rod 11 to cooperate therewith to form a one-way connection which permits the actuator rod 11 to be moved relative to the stem 10 toward the diaphragm 4 but prevents the actuator rod 11 from being moved relative to the stem 10 away from the diaphragm 4.

Compared with the prior art two-stage actuator discussed above, the actuator according to the present invention is advantageous in that it is formed by a greatly reduced number of component parts and thus can be easily and economically manufactured. Since the actuator of the invention utilizes bellowses, the actuator has a reduced possibility of leakage and provides increased actuating strokes. The numbers of the convolutions of the bellowses can easily be determined to provide desired actuating strokes.

What is claimed is:

1. A multi-stage actuator comprising:
 a pair of bellows each including a hollow accordion-type convolution section having ends closed by integral end sections and a vacuum port means pneumatically connecting the bellows to a vacuum source, the convolution section of each bellows having a plurality of axially arranged convolutions and being axially collapsible to shorten the axial dimension of the bellows when vacuum is introduced into the bellows through said vacuum port means;
 said bellows being arranged in substantially axially aligned relationship;
 means mechanically connecting one of the end sections of one of said bellows to an adjacent end section of the other bellows;
 the other end section of said one bellows being designed to be fixed to a stationary machine part so that, when said convolution section of said one bellows is axially collapsed, said one end section of said one bellows is axially moved together with said mechanically connecting means and with the other bellows toward said stationary machine part;

the other end section of the other bellows being designed to be mechanically connected to a movable machine part; and means extending axially over the convolution section of the other bellows to prevent said convolution section of the other bellows from being axially stretched when said one bellows is axially collapsed and to transmit to said movable machine part the movement of said one end section of said one bellows toward said stationary machine part, said axially extending means and the other bellows being arranged such that the convolution section of the other bellows is axially collapsible relative to said axially extending means to move the other end section of the other bellows relative to said axially extending means toward said stationary machine part, wherein the other end section of the other bellows comprises an axially elongated protrusion axially extending from the adjacent end of the convolution section of the other bellows, and wherein said axially extending means comprises an axially extending link member including means fixing one end of said link member relative to said mechanically connecting means and means on the other end of said link member forming a guide operatively associated with said axially elongated protrusion, said guide being so shaped as to slidaby accomodate said axially elongated protrusion to allow the same to be moved relative to said guide toward said one bellows and act as a stop for preventing movement of the adjacent end of the convolution section of the other bellows relative to said link member toward said movable machine part when the one bellows is axially collapsed.

2. A multi-stage actuator according to claim 1, wherein said two bellows are molded from a thermoplastic material and said mechanically connecting means comprises a molded link section integral with said two bellows.

3. A multi-stage actuator according to claim 2, wherein said link member is a substantially cylindrical hollow member enclosing the convolution section of the other bellows and including a pair of substantially semi-cylindrical parallel sections, an elastic hinge integral with and pivotally connecting adjacent side edges of said semi-cylindrical sections together and locking means on the other side edges of said semi-cylindrical sections for keeping said semi-cylindrical sections closed one to the other, said semi-cylindrical sections having notched end walls, the notch in one end wall of one of said semi-cylindrical sections and the notch in the adjacent end wall of the other semi-cylindrical section cooperating together to form said guide when said semi-cylindrical sections are closed around said convolution section of the other bellows while the other end walls of said semi-cylindrical sections are shaped to cooperate to firmly grip said link section when said semi-cylindrical sections are so closed.

4. A multi-stage actuator according to claim 2, wherein said vacuum port means comprises a pipe connected to and extending through the other end section of each of said bellows.

5. A multi-stage actuator according to claim 3, wherein the other end section of each of said bellows is formed therein with at least one opening for a mechanical connecting element.

6. A multi-stage actuator according to claim 2, wherein said link member is formed of a plastic material and comprises at least two axially extending sections and integral end walls which are notched to form said fixing means and said guide, respectively.

7. A multi-stage actuator according to claim 2, wherein said link member is formed of a plastic material and comprises at least two axially extending sections and an end wall defining therein an opening which forms said guide, said end wall interconnecting adjacent ends of said axially extending sections, the other ends of said axially extending sections being turned toward each other to provide radial walls substantially perpendicular to the axis of the other bellows, said radial walls being designed to be fixed with respect to the adjacent end of the convolution section of the other bellows.

* * * * *